United States Patent
Lutz et al.

(10) Patent No.: US 12,482,240 B2
(45) Date of Patent: Nov. 25, 2025

(54) METHOD FOR DETECTING AND CLASSIFYING OBJECTS IN ROAD TRAFFIC

(71) Applicant: Robert Bosch GmbH, Stuttgart (DE)

(72) Inventors: Robert Lutz, Stuttgart (DE); Frank Lindner, Ulm (DE); Daniel Hundsdoerfer, Stuttgart (DE); Jonathan Kausch, Stuttgart (DE); Libor Novak, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 18/042,750

(22) PCT Filed: Jul. 26, 2021

(86) PCT No.: PCT/EP2021/070816
§ 371 (c)(1),
(2) Date: Feb. 23, 2023

(87) PCT Pub. No.: WO2022/058074
PCT Pub. Date: Mar. 24, 2022

(65) Prior Publication Data
US 2023/0306751 A1 Sep. 28, 2023

(30) Foreign Application Priority Data
Sep. 16, 2020 (DE) ...................... 10 2020 211 586.9

(51) Int. Cl.
*G06V 10/776* (2022.01)
*G06V 20/58* (2022.01)

(52) U.S. Cl.
CPC ............ *G06V 10/776* (2022.01); *G06V 20/58* (2022.01)

(58) Field of Classification Search
CPC ..................... G06V 20/56–588; G06V 10/776
See application file for complete search history.

(56) References Cited

U.S. PATENT DOCUMENTS

| | | |
|---|---|---|
| 8,509,523 B2 | 8/2013 | Schamp |
| 2019/0244516 A1 | 8/2019 | Matus et al. |

(Continued)

FOREIGN PATENT DOCUMENTS

| | | |
|---|---|---|
| EP | 3 291 146 A1 | 3/2018 |
| JP | 2009-244946 A | 10/2009 |
| JP | 2018-173946 A | 11/2018 |

OTHER PUBLICATIONS

International Search Report corresponding to PCT Application No. PCT/EP2021/070816, mailed Oct. 21, 2021 (German and English language document) (5 pages).

(Continued)

*Primary Examiner* — Casey L Kretzer
(74) *Attorney, Agent, or Firm* — Maginot, Moore & Beck LLP

(57) ABSTRACT

A method (40) for detecting and classifying at least one object in road traffic is disclosed. Sensor data from a sensor are first of all provided. At least one object is detected and classified on the basis of the sensor data using a neural network. The object is additionally detected and classified on the basis of the sensor data using a symbolic monitoring algorithm. A check is carried out in order to determine whether the neural network and the symbolic monitoring algorithm provide consistent results with respect to the detection and classification of the object.

12 Claims, 3 Drawing Sheets

(56) References Cited

U.S. PATENT DOCUMENTS

| | | |
|---|---|---|
| 2019/0279004 A1* | 9/2019 | Kwon ...................... G06N 3/08 |
| 2020/0160699 A1 | 5/2020 | Annapureddy et al. |
| 2020/0175284 A1* | 6/2020 | Viswanathan ............ G06T 7/97 |
| 2020/0193313 A1* | 6/2020 | Ghanta .................. G06N 20/00 |
| 2021/0201057 A1* | 7/2021 | Lin ......................... G06F 18/24 |

OTHER PUBLICATIONS

Bailing Zhang, "Reliable Classification of Vehicle Types Based on Cascade Classifier Ensembles," IEEE Transactions on Intelligent Transportation Systems, vol. 14, Nr. 1, Mar. 1, 2013 (Mar. 1, 2013). pp. 322-332, XP055851144.

Jensen et al., "Traffic Light Detection at Night: Comparison of a Learning-based Detector and three Model-based Detectors," Advances in Visual Computing ISVC 2015, Lecture Notes in Computer Science, vol. 9474, 2015, pp. 774-783.

* cited by examiner

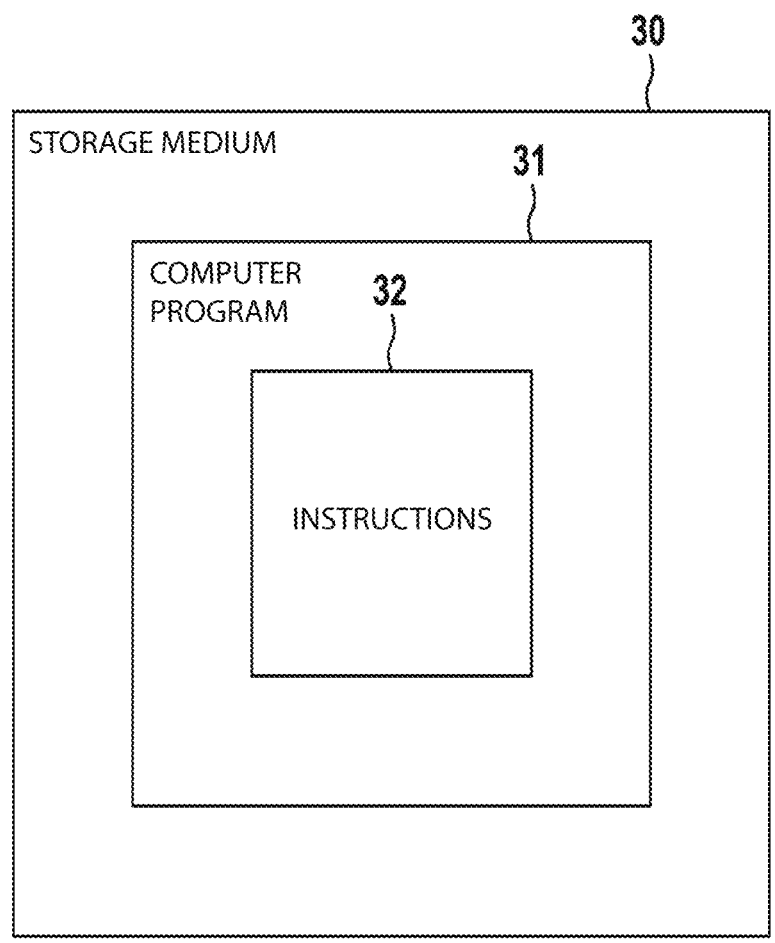

METHOD FOR DETECTING AND CLASSIFYING OBJECTS IN ROAD TRAFFIC

This application is a 35 U.S.C. § 371 National Stage Application of PCT/EP2021/070816, filed on Jul. 26, 2021, which claims the benefit of priority to Serial No. DE 10 2020 211 586.9, filed on Sep. 16, 2020 in Germany, the disclosures of which are incorporated herein by reference in their entirety.

The present disclosure relates to a method for detecting and classifying at least one object in road traffic.

BACKGROUND

In the context of a control system of an autonomous motor vehicle, detection of traffic light systems is a safety-relevant aspect. For example, an erroneously detected signal that requires the autonomous motor vehicle to be stopped may result in a sudden braking process being initiated within the framework of the control system, which can lead to a collision, for example. Conversely, such a signal may not be recognized, which can lead to a violation of traffic rules and also to an accident. For this reason, a method for detecting and classifying a traffic light system should be designed in such a way that unexpected or inappropriate driving maneuvers can be avoided. Furthermore, a corresponding detection system must be protected against misuse and attacks.

In general, detection of an object can be broken down in such a way that different sensors are involved, as a result of which a lower reliability of a first sensor can be compensated for by a relatively higher reliability of a second sensor. However, this is not possible when detecting traffic light systems in road traffic, since only one sensor modality, namely a camera, can detect a color of a signal generator of a traffic light system by providing color images of the traffic light system. For this reason, it is necessary to ensure a minimum level of integrity of the detection of traffic light systems by a camera. This can be achieved, for example, in that the detection takes place in a redundant manner.

It is known to use neural networks for detecting and classifying traffic light systems in images of a camera. An advantage of neural networks is that they provide a high probability of object recognition and only a small number of false positive results. Neural networks, however, also have disadvantages. For example, this is a technology whose properties cannot yet be fully understood. A decision-making process of a neural network cannot be analyzed and interpreted, for example. This leaves it unclear what prompts a neural network to make certain decisions. Even if a neural network can be trained and tested using a comprehensive data set, it can nevertheless behave in an unexpected manner due to rare or atypical traffic scenarios or traffic situations which are not sufficiently represented in the training and test data set, or due to noise and/or artifacts in an image.

Furthermore, neural networks are vulnerable to attacks by means of artificial patterns, which can cause incorrect detection and/or classification. Such patterns can be printed on film, for example, and affixed to a windshield of a motor vehicle and/or to a signal generator of a traffic light system. However, the patterns could also be generated virtually and superimposed with the images of a camera.

An object of the present disclosure is to provide an improved method for detecting and classifying at least one object in road traffic, a system which is configured to carry out the method, a computer program comprising instructions which, when the computer program is executed by a computer, cause the computer to carry out the method, and a machine-readable storage medium on which the computer program is stored. This object is achieved by a method for detecting and classifying at least one object in road traffic, a system which is configured to carry out the method, a computer program comprising instructions which, when the computer program is executed by a computer, cause the computer to carry out the method and a machine-readable storage medium on which the computer program is stored. Advantageous developments of the disclosure are also specified below.

SUMMARY

A method for detecting and classifying at least one object in road traffic comprises the following method steps. Sensor data from a sensor are first of all provided. At least one object is detected and classified on the basis of the sensor data using a neural network. The object is additionally detected and classified on the basis of the sensor data using a redundant symbolic monitoring algorithm. A check is carried out in order to determine whether the neural network and the symbolic monitoring algorithm provide consistent results with respect to the detection and classification of the object.

The object can be, for example, a traffic light system with signal generators which is provided for traffic management in road traffic. However, the object can also be a sign, a motor vehicle, a pedestrian or a cyclist. The symbolic monitoring algorithm is based on a symbolic machine learning approach. It is therefore a classic and rule-based algorithm. In the case of the symbolic monitoring algorithm, trained examples are explicitly represented, i.e. the decision-making process of the symbolic monitoring algorithm is comprehensible. In contrast, the neural network is based on a non-/sub-symbolic approach, i.e. trained examples are implicitly represented.

The method is advantageously characterized in that a redundant detection and classification of the object takes place. The neural network represents a first detection and classification path, while the symbolic monitoring algorithm represents a second detection and classification path. The second detection and classification path is designed independently of the first detection path. Because the neural network is additionally monitored, the object can be reliably detected and classified, even if the neural network is susceptible to erroneous detections and/or incorrect classifications. In addition, the second detection path can make it possible to prevent attacks by means of artificial patterns that are not trained in the neural network and are designed to deceive the neural network (adversarial attacks). The method can advantageously contribute to road traffic safety through a high degree of reliability.

In one embodiment, before the consistency check, an additional symbolic monitoring algorithm checks whether the object detected and classified by the neural network has predefined properties. Advantageously, results of the neural network are additionally checked as a result. This makes it possible to use the results of the detection and classification of the neural network in relatively non-critical traffic situations for a control system of an autonomous motor vehicle. The additional symbolic monitoring algorithm is designed to check output data of the neural network which contain the results of the detection and classification of the object by the neural network. The output data contain a representation of the detected and classified object, which are checked for predefined properties by the additional monitoring algorithm. The additional symbolic monitoring algorithm can be used to check, for example, whether a geometry of the object, a size of the object and/or its color are meaningfully represented within the output data. Alternatively or additionally, it can also be checked whether a color distribution corresponds to meaningful specifications.

In one embodiment, the symbolic monitoring algorithm and/or the additional symbolic monitoring algorithm comprises a plurality of symbolic sub-algorithms or additional symbolic sub-algorithms. This can be, for example, a bright spot detector and/or a circle detector and/or a symbolic classifier.

In one embodiment, the sensor data are provided at a predefined frequency and the consistency check is carried out at predefined time intervals. Advantageously, the method can thereby be adapted to a traffic situation. For example, the consistency check can be carried out at different time intervals depending on the traffic situation. In the immediate vicinity of an intersection or in a critical situation, for example, it may be necessary to carry out consistency checks at shorter time intervals.

In one embodiment, results of the detection and classification of the neural network and the symbolic monitoring algorithm are stored in a memory. In the context of an additional method step of the method, a set of statistics is created on the results of a plurality of consistency checks within a predefined time period. These temporal statistics can advantageously increase the reliability of the detection and/or the classification of the object and thereby contribute to increased safety in road traffic. As a result, the first detection and classification path and the second detection and classification path do not have to be designed to be identical to one another. A detection and classification path may be superior (e.g. the first detection and classification path comprising the neural network) and primarily allow availability and high comfort behavior of an autonomous motor vehicle, while the other detection and classification path may validate more critical decisions. In one embodiment, the set of statistics contains information on how often the object was detected by the neural network and by the symbolic monitoring algorithm and how often results of the neural network were validated by the symbolic monitoring algorithm with regard to detection and classification.

In one embodiment, the object is considered to be detected and classified if there is a predefined number of consistent results. In one embodiment, the predefined number of consistent events is determined depending on a distance of the object from the sensor. In principle, the closer the object is to the sensor, the more likely it is that it can be correctly detected and correctly classified. For critical driving maneuvers, a specific number of consistent results is required on both detection and classification paths. For comfort driving maneuvers, on the other hand, one detection and classification path can be sufficient to deliver reliable results. This approach is based on the idea that critical driving maneuvers tend to be initiated in the region close to an object, for example a traffic light system. In the region close to the object, both detection and classification paths can recognize the object with a high probability. This procedure thus prevents the naturally different detection probabilities/performances of the two detection and classification paths from impairing a detection and classification performance overall, which can be the case, for example, due to a failed comparison at a great distance from the object.

In one embodiment, the sensor is a camera which provides images as sensor data. A camera advantageously makes it possible to detect colors of the object and an area surrounding the object, as a result of which states of traffic light systems can be detected, for example. However, road signs, vehicles, pedestrians, cyclists or other road users or objects can also be detected and classified.

In one embodiment, the sensor is a component of an autonomous motor vehicle. In one embodiment, an object that is considered to be detected and classified is taken into account as a component of an automatic control system of the autonomous motor vehicle. In this case, the vehicle is operated based on the classification. For example, transverse and or longitudinal control can take place based on the classification.

A system is configured to carry out the method for detecting and classifying at least one object. A computer program comprises instructions which, when the computer program is executed by a computer, are used to carry out the method for detecting and classifying at least one object. The computer program is stored on a machine-readable storage medium.

BRIEF DESCRIPTION OF THE DRAWINGS

The features and advantages of this disclosure described above become clearer and more understandable in conjunction with the following description of the exemplary embodiments, which are explained in more detail in conjunction with the schematic drawings. In the drawings:

FIG. 3: shows a machine-readable storage medium on which a computer program is stored, said computer program comprising instructions which, when the computer program is executed by a computer, cause the computer to carry out the method of FIG. 1.

DETAILED DESCRIPTION

Figure 1:
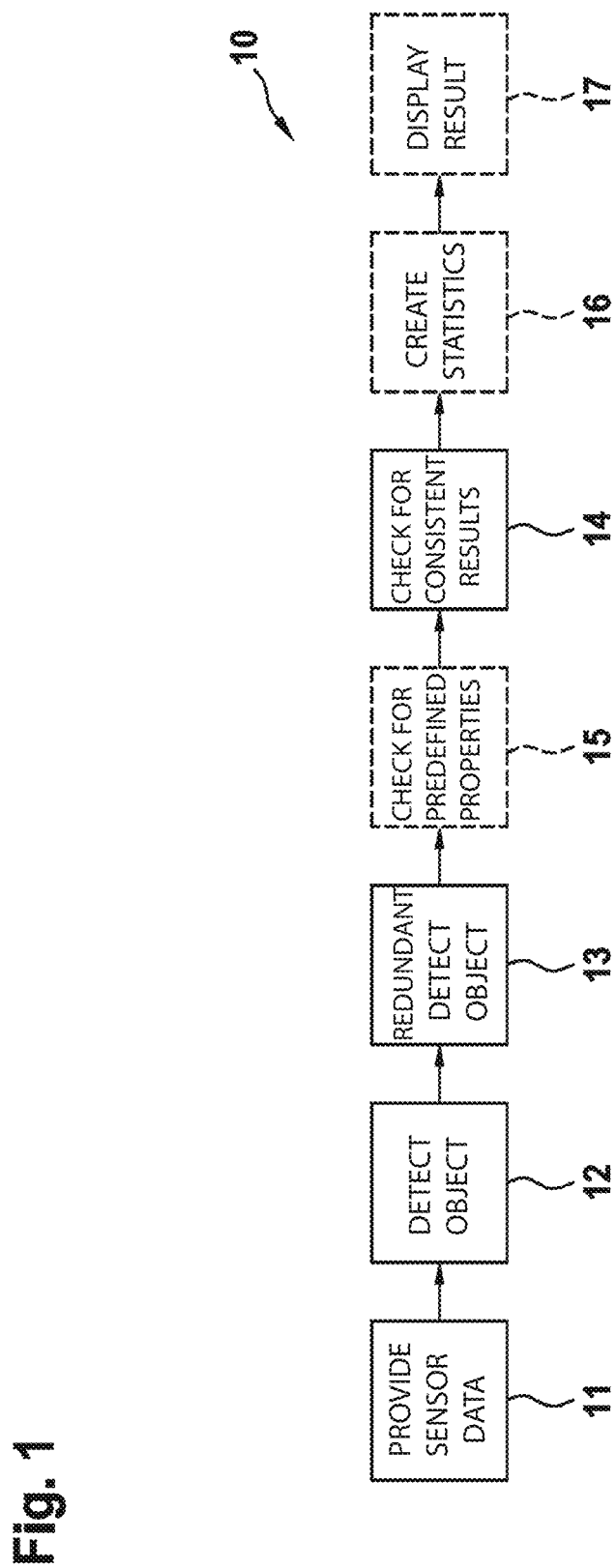
FIG. 1: shows a method for detecting and classifying at least one object in road traffic.

FIG. 1 schematically shows a method 10 for detecting and classifying at least one object in road traffic.

In the context of a first method step 11 of the method 10, sensor data of a sensor are provided. For example, a camera which provides sensor data in the form of images can be used as the sensor. The camera can be designed, for example, to generate images in the visible electromagnetic spectrum. Alternatively, the camera can also be designed as an infrared camera. However, a camera does not necessarily have to be used as the sensor. The sensor could also be a LIDAR (light detection and ranging) system, for example. The sensor can be a component of an autonomous motor vehicle, for example. However, the sensor can also be a component of a conventional motor vehicle.

In a second method step 12 of the method 10, at least one object is detected and classified on the basis of the sensor data using a neural network. For example, the neural network can be provided with images that are captured in the context of a journey by an autonomous motor vehicle. The neural network can be designed, for example, as a deep neural network (DNN), i.e. the neural network can have a large number of processing neuron layers. The neural network can also be, for example, a convolution network (CNN). The neural network is trained to detect and classify objects. For example, the neural network can be trained to detect and classify traffic light systems which are provided for traffic management in road traffic. The neural network can be trained to detect and classify road signs and/or other objects such as motor vehicles or buildings. The training of the neural network can also comprise learning to detect and classify pedestrians and/or cyclists. A suitable neural network can be used depending on which objects are to be detected and classified within the scope of the method 10. The neural network represents a first detection and classification path.

As a result of the detection and the classification, the neural network generates output data which contain a representation of the detected and classified object. For example, the neural network can be designed such that detected objects are framed by a rectangular box (bounding box). The neural network can also be designed to detect and classify colors in the sensor data. This allows the neural network to recognize a state of a traffic light system, for example. Information about states of traffic light systems can be used in the context of an automatic control system of an autonomous motor vehicle.

In a third method step 13 of the method 10, which can be carried out simultaneously with the second method step 12, the at least one object is additionally detected and classified redundantly on the basis of the sensor data using a symbolic monitoring algorithm. In contrast to a neural network, which is based on a non- and/or sub-symbolic learning approach in which trained examples are implicitly represented, the symbolic monitoring algorithm is based on a symbolic approach. In this case, trained examples are explicitly represented. As a result, the decision-making process of the symbolic monitoring algorithm can be understood and reasons for a decision-making process can be named. This is not the case with the neural network. The symbolic monitoring algorithm represents a second redundant detection and classification path.

In a fourth method step 14 of the method 10, a check is carried out to determine whether the neural network and the symbolic monitoring algorithm provide consistent results with respect to the detection and classification of the object. If this is the case, the object is considered to have been detected and classified. In this case, information about the object can be used, for example, in the context of an automatic control system of an autonomous motor vehicle. For example, a state of a traffic light system can be detected, classified and used for automatic control. The object can, for example, be considered to be detected and classified if there is a predefined number of consistent results. Because the neural network is additionally monitored using the symbolic monitoring algorithm, the object can be reliably detected and classified. The method can advantageously contribute to road traffic safety through a high degree of reliability.

In an optional fifth method step 15 of the method 10, before the consistency check, an additional symbolic monitoring algorithm is used to check whether the object detected and classified by the neural network has predefined properties. The additional symbolic monitoring algorithm is also based on a symbolic approach and is classically rule-based. The additional symbolic monitoring algorithm is designed to check the representation of the detected and classified object in the output data of the neural network. The additional symbolic monitoring algorithm can be used to check, for example, whether a geometry of the object, a size of the object and/or its color are meaningfully represented within the output data. Alternatively or additionally, it can also be checked whether a color distribution, for example in the case of traffic light systems, corresponds to meaningful specifications. If the object has no predefined properties, the detection and classification of the object is characterized as unreliable in one embodiment of the method 10.

The symbolic monitoring algorithm and/or the additional symbolic monitoring algorithm may comprise a plurality of symbolic sub-algorithms or additional symbolic sub-algorithms. For example, the symbolic surveillance algorithms may include a bright spot detector. A bright spot detector is designed to detect and/or classify bright pixels in front of a dark background within an image. The symbolic monitoring algorithms may alternatively or additionally comprise a circle detector. A bright spot detector and a circle detector are suitable, for example, for detecting and classifying signal generators of a traffic system in road traffic. A further symbolic sub-algorithm can be designed, for example, to count a number of colored pixels within the signal generator in order to compare the signal state recognized by the neural network with the state that results from the plurality of colored pixels.

The method 10 can be carried out, for example, in such a way that the sensor data are provided at a predefined frequency. The sensor data can be provided, for example, at a frequency of 15 Hz. However, this is not mandatory. The sensor data can be provided at any frequency for the detection and classification of at least one object. In addition, the consistency check or a plurality of consistency checks can also be carried out at predefined time intervals, for example every 40 seconds. However, consistency checks can also be carried out at other time intervals. The time intervals can be regular or irregular. The time intervals between the consistency checks can be predefined depending on a distance between the object and the sensor, for example.

The results of the detection and classification of the neural network and the symbolic monitoring algorithm can be stored in a memory. In a sixth optional method step 16 of the method 10, a set of statistics is created on the results of a plurality of consistency checks within a predefined time period. This procedure can also be referred to as "merge and track", since the results of the detection and classification of the neural network and the symbolic monitoring algorithm are each linked and recorded over a certain time period. The set of statistics can contain, for example, information on how often the object was detected by the neural network and by the symbolic monitoring algorithm and how often results of the neural network were validated by the symbolic monitoring algorithm with regard to detection and classification. In this case too, the object can be considered to be detected and classified, for example, if there is a predefined number of consistent results. Whether the object is considered to be detected and/or classified can be displayed in a seventh optional method step 17.

The object considered to be detected and classified can be taken into account, for example, in the context of an automatic control system of the autonomous motor vehicle. For example, a traffic light system that was in a red phase at the time of detection can be detected. The autonomous motor vehicle can be stopped in response thereto. In order to be able to react appropriately to a traffic situation, in one embodiment of the method 10 the predefined number of consistent events can be defined depending on a distance of the object from the sensor. The probability of an object being correctly detected and classified increases with decreasing distance. If the method 10 is used in the context of an automatic control system of an autonomous motor vehicle, a certain number of consistent results is required on both detection and classification paths for critical driving maneuvers. For comfort driving maneuvers, on the other hand, one detection and classification path can be sufficient to deliver reliable results. Critical driving maneuvers must regularly be initiated in the region close to a traffic light system. In the region close to the object, both detection and classification paths can identify the object with a high probability. This procedure thus prevents the naturally different detection probabilities/performances of the two detection and classification paths from impairing a detection and classification performance overall, which can be the case, for example, due to a failed comparison at a great distance from the object.

Figure 2:
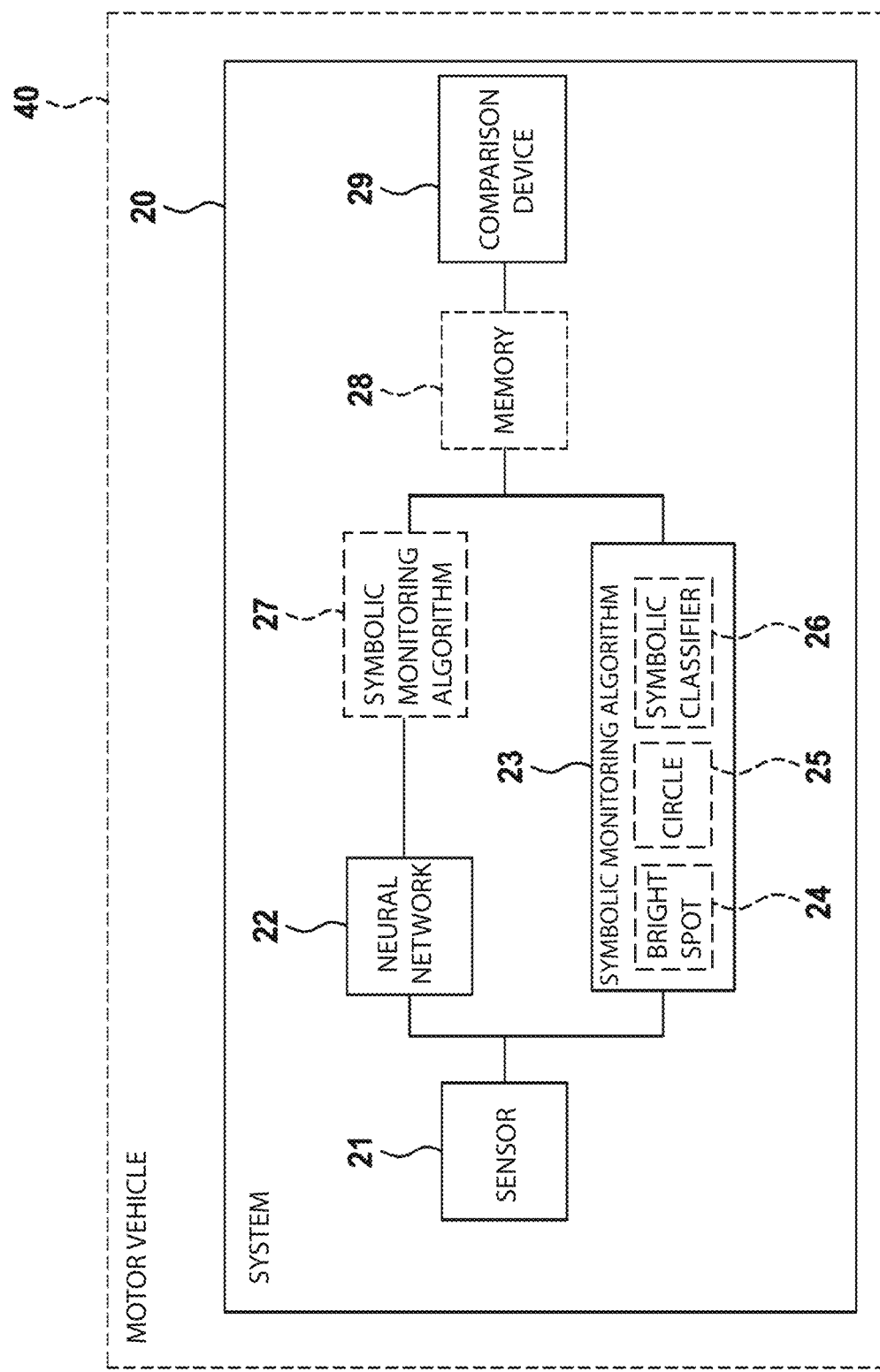
FIG. 2: shows a system which is configured to carry out the method of FIG. 1.

FIG. 2 schematically shows a system 20 which is configured to carry out the method 10 of FIG. 1. The system 20 comprises the sensor 21. The sensor 21 is designed to generate the sensor data and to provide said data to the neural network 22 and the symbolic monitoring algorithm 23. The symbolic monitoring algorithm 23 may comprise the bright spot detector 24, the circle detector 25 and/or a symbolic classifier 26.

The system 20 also comprises the additional symbolic monitoring algorithm 27. However, this is only optional and can also be omitted. The system 20 may also comprise a memory 28. To check whether the neural network and the symbolic monitoring algorithm provide consistent results with respect to the detection and classification of the object, the system 20 comprises a comparison device 29. The comparison device 29 can be designed to create the set of statistics on the results of a plurality of consistency checks within a predefined time period. Alternatively, an additional evaluation device (not shown in FIG. 2) can be designed to create the set of statistics. The comparison device 29 or alternatively a display device (not shown in FIG. 2) can be designed to mark the object as detected and classified if a predefined number of consistent results is present, for example in the context of the set of statistics.

The system 20 can, for example, be a component of a motor vehicle 40, for example an autonomous motor vehicle 40. All elements of the system 20 shown in FIG. 2 can be components of a motor vehicle 40. However, this is not mandatory. For example, only part of the system 20 may be a component of a motor vehicle 40. It is possible, for example, that only the sensor 21 of the system 20 is a component of a motor vehicle 40.

FIG. 3 schematically shows a machine-readable storage medium 30 on which a computer program 31 is stored, said computer program comprising instructions 32 which, when the computer program is executed by a computer, cause the computer to carry out the method of FIG. 1.

The invention claimed is:

1. A method for detecting and classifying at least one object in road traffic, comprising:
   providing sensor data from a sensor;
   detecting and classifying at least one object based on the sensor data using a neural network;
   detecting and classifying the at least one object based on the sensor data using a symbolic monitoring algorithm;
   checking whether the neural network and the symbolic monitoring algorithm provide consistent results with respect to the detection and classification of the at least one object; and
   before the consistency check, checking with an additional symbolic monitoring algorithm whether the at least one object detected and classified by the neural network has predefined properties.

2. The method according to claim 1, wherein the symbolic monitoring algorithm and/or the additional symbolic monitoring algorithm comprises a plurality of symbolic sub-algorithms.

3. The method according to claim 1, wherein the sensor data are provided at a predefined frequency and the consistency check is carried out at predefined time intervals.

4. The method according to claim 1, wherein results of the detection and classification of the neural network and the symbolic monitoring algorithm are stored in a memory, the method further comprising:
   creating a set of statistics on the results of a plurality of consistency checks within a predefined time period.

5. The method according to claim 4, wherein the set of statistics contains information on how often the at least one object was detected by the neural network and by the symbolic monitoring algorithm and how often results of the neural network were validated by the symbolic monitoring algorithm with regard to detection and classification.

6. The method according to claim 1, wherein the sensor is a camera which provides images as sensor data.

7. The method according to claim 1, wherein the sensor is a component of an autonomous motor vehicle.

8. The method according to claim 7, wherein an object that is considered to be detected and classified is taken into account within a framework of an automatic control system of the autonomous motor vehicle.

9. A system which is configured to carry out the method according to claim 1.

10. The method according to claim 1, wherein a computer program comprises instructions which, when the computer program is executed by a computer, cause the computer to carry out the method.

11. A non-transitory machine-readable storage medium on which the computer program according to claim 10 is stored.

12. A method for detecting and classifying at least one object in road traffic, comprising:
   providing sensor data from a sensor;
   detecting and classifying at least one object based on the sensor data using a neural network;
   detecting and classifying the at least one object based on the sensor data using a symbolic monitoring algorithm; and
   checking whether the neural network and the symbolic monitoring algorithm provide consistent results with respect to the detection and classification of the at least one object,
   wherein the at least one object is considered to be detected and classified when there is a predefined number of consistent results, and
   wherein the predefined number of consistent results is determined depending on a distance of the at least one object from the sensor.

* * * * *